July 24, 1951  E. J. BUCSKO ET AL  2,561,336
WALL FINISH GROOVING TOOL
Filed March 18, 1948
Fig. 1.
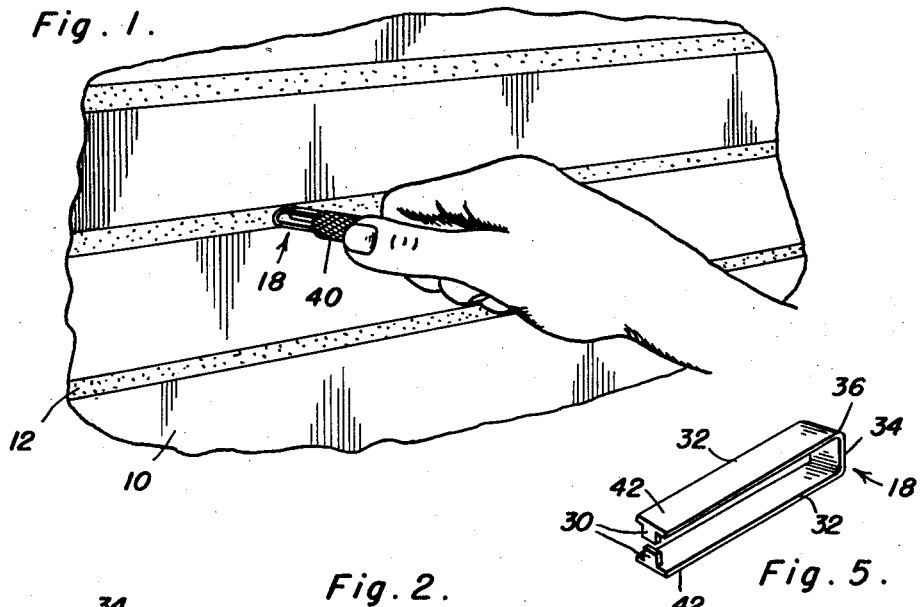
Fig. 5.
Fig. 2.
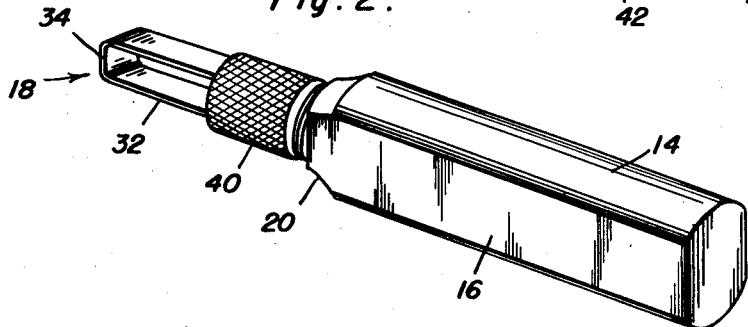
Fig. 3.
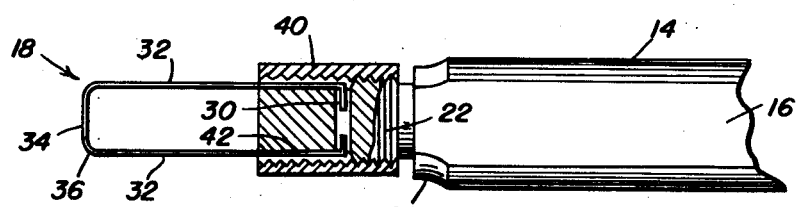
Fig. 4.
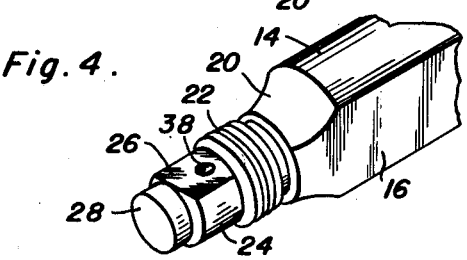
Eugene J. Bucsko
Victor T. Wedrite
INVENTORS Patented July 24, 1951

2,561,336

UNITED STATES PATENT OFFICE 2,561,336

WALL FINISH GROOVING TOOL

Eugene J. Bucsko and Victor T. Wedrite, Pontiac, Mich.

Application March 18, 1948, Serial No. 15,644

3 Claims. (Cl. 30—280)

This invention relates generally to tools or implements for cutting grooves in the outer layer or layers of a wall finish before the hardening of the same, and more specifically to a tool of this character having a definite width of grooving blade which is replaceable, and the invention includes improvements and refinements in structure whereby such blades are secured to the handle.

A primary object of this invention is to provide a wall finish grooving tool with blade attachment means facilitating the securement of blades of different widths on a handle.

Another object of this invention is to provide means for securing a grooving blade on a handle which will satisfactorily hold a blade of extremely simple form which can, therefore, be manufactured economically, and since the blade is the portion of the device which wears out most rapidly, the economy of using this tool is increased.

Still another object of this invention is to provide a tool of this general character in which the number of parts is limited to an absolute minimum, none of these parts being particularly small and not easily lost or misplaced, the actual mechanical movements necessitated in removing a damaged blade from the tool handle and replacement with a new blade being extremely simple.

And the last object to be mentioned specifically is to provide a grooving tool in which all of the parts thereof are relatively inexpensive and practicable to manufacture, and which will give generally efficient and durable service.

With these objects definitely in view, this invention resides in certain novel features of construction, combination and arrangement of elements and portions as will be hereinafter described in the specification, particularly pointed out in the appended claims, and illustrated in the accompanying drawings which form a material part of this application, and in which:

Figure 1 is a three-dimensional view of this tool being used in connection with a portion of a wall upon which the finish is not completely dried;

Figure 2 is a three-dimensional view of the grooving tool;

Figure 3 is a view of a portion of the tool, part of the handle being shown in elevation, a part of the threaded portion being also shown in elevation, the remaining portion of the threaded portion and the shank and collar being shown in vertical section, and the grooving blade being shown in edge elevation;

Figure 4 is a three-dimensional view of a portion of the handle with the threaded integral portion and the shank integral portion; and Figure 5 is a three-dimensional view of the grooving blade.

Similar characters of reference designate similar or identical elements and portions throughout the drawings and throughout the following specification.

Referring now to the drawings in detail, the environment wherewith this invention is adapted to be used will include a wall upon which finish layers 10 and 12 have been applied and allowed to harden partially. It will be understood that the wall finish layer 10 is superficial and the layer 12 represents material covered by the superficial layer 10 until such time as strips of the layer 10 are removed by use of the tool which is a subject matter of this application. There may be several layers in the wall finish, ordinarily differently colored, varying the depth to which the superficial layer or layers are undercut. For example, this tool is ideally constructed for use in forming the undercuts or grooves used by builders in creating a wall finish simulating bricks, and it will be understood that in some instances two or even more colors in the finished wall may be achieved, simply by removal of overlying differently colored layers.

The tool proposed by this invention includes a handle 14 which will ordinarily be elongated and will preferably have flat sides 16 facilitating the gripping of the handle and the orientation of the same relative to the grooving blade 18, one of the flat sides 16 ordinarily being held under the thumb of the operator's hand.

The handle may be reduced as at 20 and provided with a threaded portion 22 which may be integral with the further reduced shank 24. The shank extends on the threaded portion 22 in a direction remote from the handle 16 and this shank is formed with a pair of transversely oppositely disposed flat sides 26. The extreme end portion of the shank 24 may be further reduced as indicated at 28 and this portion 28 will comprise a simple cylinder which functions as a guide and spreader for the ends 30 of the grooving blade 18.

This grooving blade will be constructed from flat strap material of limited resiliency and will comprise a loop having parallel sides 32 and the ends 30 will be inturned and reduced as to their transverse dimension. The bight portion 34 of the blade will be parallel to the inturned ends 30 and may be sharpened on both edges. The portions of the parallel sides 32 adjacent to the bight portion 34 may also be sharpened and it should be carefully noted that the corners 36 are rounded. This rounding of the corners 36 has a dual function in providing for stronger construction of the blade and also facilitating the provision of a clean cut in the cementitious material of the wall finish. It has been found that a blade of this character can be used satisfactorily without being followed by a troweling or smoothing operation. The width of the bight portion 34 is considerable, as illustrated in the drawings, so that the material removed by the grooving blade is driven outwardly from the wall and falls clear during the operation of the tool, and it will be clearly understood that blades of different widths may be used with the same handle 14.

The shank 24 is apertured at 38 substantially centrally transversely of the flat sides 26, and the apertures 38 are placed considerably nearer to the threaded portion 22 than to the blade guide 28.

An internally threaded collar is adapted to be screwed onto the threaded portion 22, while the ends 30 of the blade are inserted in the apertures 38, thus holding the portions 42 of the blade in abutment with the flat sides 26 of the shank 24. The outer end of this collar 40 need not be threaded, but if the collar is threaded throughout the length thereof, this collar may be applied without reference being had to insertion of the proper end on to the threaded portion 22, thus slightly simplifying the assembly of the tool.

The operation of this invention will be clearly understood from the foregoing description of the mechanical details thereof, taken in connection with the drawings and the above recitation of the objects sought to be achieved by this invention.

In recapitulation it may be added that in assembling the tool, the blade 18 is held in one hand and forced against the guide and spreader member 28 so that the ends 30 are spread apart and slid onto the flat sides 26 and thereafter into the apertures 38. The collar 40 is then inserted over the blade 18 and screwed on to the threaded portion 22.

It will be clear that all the objects recited above are amply achieved by this invention and further description thereof would appear to be unnecessary.

Obviously many minor variations may be made in the exact details of construction and proportionment of the various parts of this invention, all without departure from the spirit and scope thereof. Accordingly, the scope of the invention should be determined only in accordance with a proper interpretation of the terms used in the subjoined claims.

Having described the invention, what is claimed as new is:

1. A wall finish grooving tool comprising a handle having a male threaded portion, a shank extending coaxially from said threaded portion, a grooving blade, and an internally threaded collar which is screwed onto said threaded portion for directly engaging and holding said grooving blade on said shank portion, said shank having transversely oppositely disposed apertures, and said blade being an open ended loop of resilient material with ends inturned for insertion in said apertures, said collar retaining said ends in said apertures.

2. A wall finish grooving tool comprising a handle, a shank on said handle having transversely oppositely disposed apertures, a grooving blade of open loop form with ends securable in said apertures, said shank having a threaded portion, and a collar screwed onto said portion and directly engaging the loop so as to hold said ends in said apertures.

3. A wall finish grooving tool comprising a handle, a shank on said handle having transversely oppositely disposed apertures, a grooving blade of open loop form with ends securable in said apertures, said shank having a threaded portion, and a collar screwed onto said portion and directly engaging the loop so as to hold said ends in said apertures, said shank having flat sides adjacent said apertures to comprise seats for portions of said blade adjacent said ends.

EUGENE J. BUCSKO.
VICTOR T. WEDRITE.

REFERENCES CITED

The following references are of record in the file of this patent:

UNITED STATES PATENTS

| Number | Name | Date |
|---|---|---|
| 959,269 | Starr | May 24, 1910 |
| 1,148,561 | Winn | Aug. 3, 1915 |
| 1,616,087 | Johnson | Feb. 1, 1927 |
| 1,624,136 | Goldblatt | Apr. 12, 1927 |
| 1,665,064 | Magrath | Apr. 3, 1928 |
| 1,679,651 | Crowell | Aug. 7, 1928 |